(12) United States Patent
Gill

(10) Patent No.: US 6,186,560 B1
(45) Date of Patent: Feb. 13, 2001

(54) SINGLE BOLT COUPLING

(76) Inventor: Ajit Singh Gill, 4169 Bennion Rd., Salt Lake City, UT (US) 84119

( * ) Notice: Under 35 U.S.C. 154(b), the term of this patent shall be extended for 0 days.

(21) Appl. No.: 09/290,627

(22) Filed: Sep. 3, 1998

Related U.S. Application Data

(63) Continuation-in-part of application No. 08/996,987, filed on Dec. 25, 1997, now abandoned.

(51) Int. Cl.$^7$ ..................................................... F16L 55/00
(52) U.S. Cl. ........................... 285/305; 285/308; 285/321
(58) Field of Search .................................. 285/305, 308, 285/321, 302, 369, 187

(56) References Cited

U.S. PATENT DOCUMENTS

| | | | |
|---|---|---|---|
| 2,901,269 | * | 8/1959 | Rickard ................................. 285/321 |
| 3,345,087 | * | 10/1967 | Hanes et al. .......................... 285/321 |
| 3,902,743 | * | 9/1975 | Martin .................................. 285/308 |
| 4,856,823 | * | 8/1989 | Heren ................................... 285/308 |
| 5,004,274 | * | 4/1991 | Bass ...................................... 285/321 |
| 5,374,088 | * | 12/1994 | Moretti et al. ........................ 285/305 |
| 5,387,017 | * | 2/1995 | Gill ....................................... 285/322 |
| 5,498,042 | * | 3/1996 | Dole ..................................... 285/305 |
| 5,653,475 | * | 8/1997 | Scheyhing et al. .................... 285/305 |
| 5,794,988 | * | 8/1998 | Gill ....................................... 285/321 |
| 5,868,441 | * | 2/1999 | Gill ....................................... 285/420 |
| 6,102,447 | * | 8/2000 | Aldridge .............................. 285/305 |

* cited by examiner

Primary Examiner—Eric K. Nicholson
(74) Attorney, Agent, or Firm—Mallinckrodt & Mallinckrodt; Robert R. Mallinckrodt; Brian R. Rayve

(57) ABSTRACT

A single bolt coupling for the attachment to the end portion of a pipe having a circumferential groove or shoulder in such end portion includes a coupling which receives the end portion of the pipe therein and a circumferential open ended resilient ring associated with the coupling body which expands to allow passage of the groove into or out of the coupling and contracts to hold the groove in the coupling. The coupling is provided with a screw vise mechanism to expand the ring so that a pipe end can easily be inserted into the coupling. After insertion, the ring is allowed to contract to hold the pipe in the coupling. The coupling with its ring can also couple plain ended pipes, the ring contracting tightly around the pipe to hold it in place by friction between the pipe and ring. The coupling may have a ring at both ends to similarly receive and hold two pipes in end-to-end relationship, or may have a different type of connector, such as threads, a flange, or a set of partially rotatable cammed jaw members at the other end, or a plain opening to make a bell type joint. The coupling may join pipes, act as an expansion joint, join various fittings to pipes, or may itself form various fittings such as valves.

18 Claims, 4 Drawing Sheets

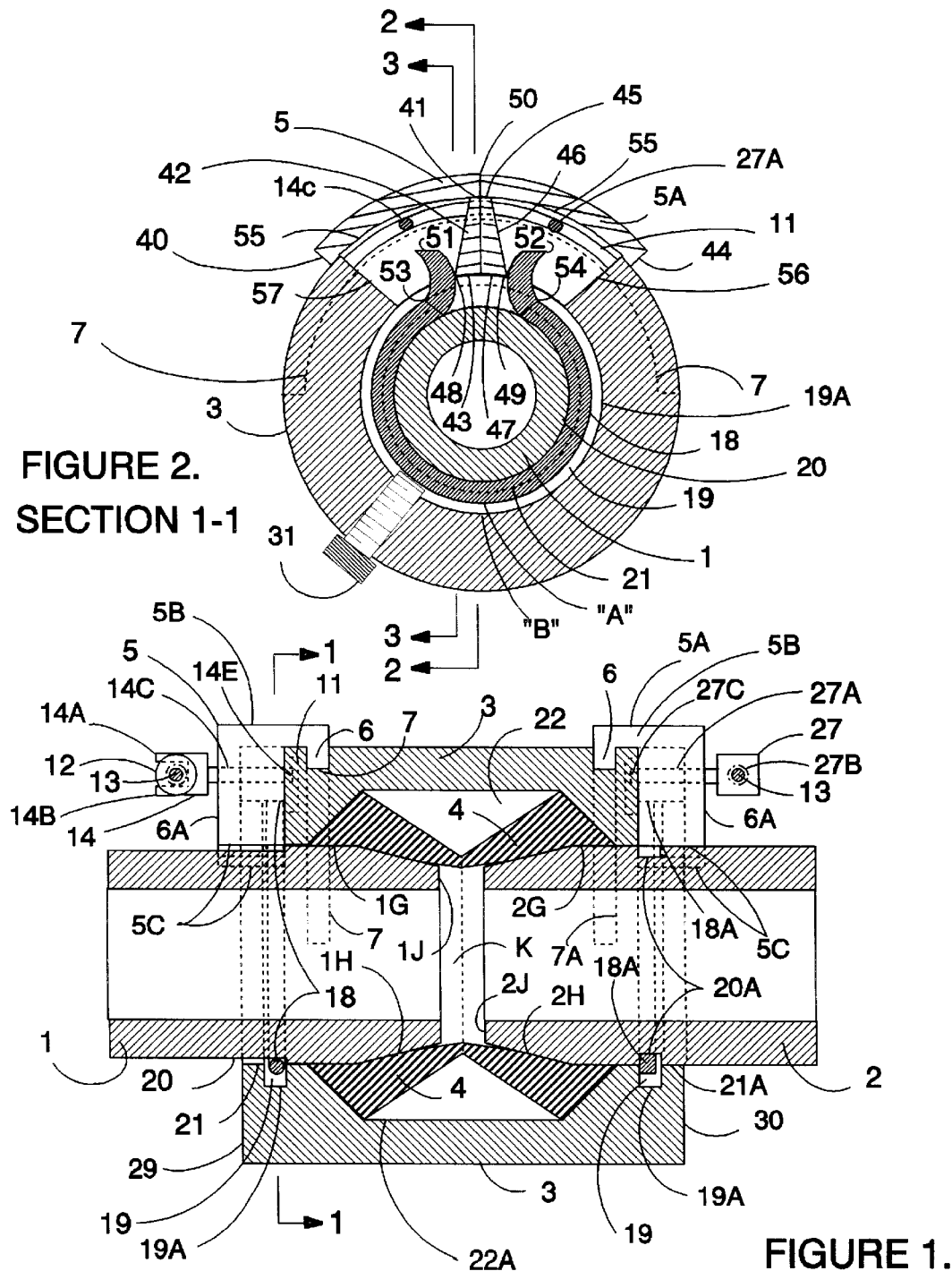

Figure 16:
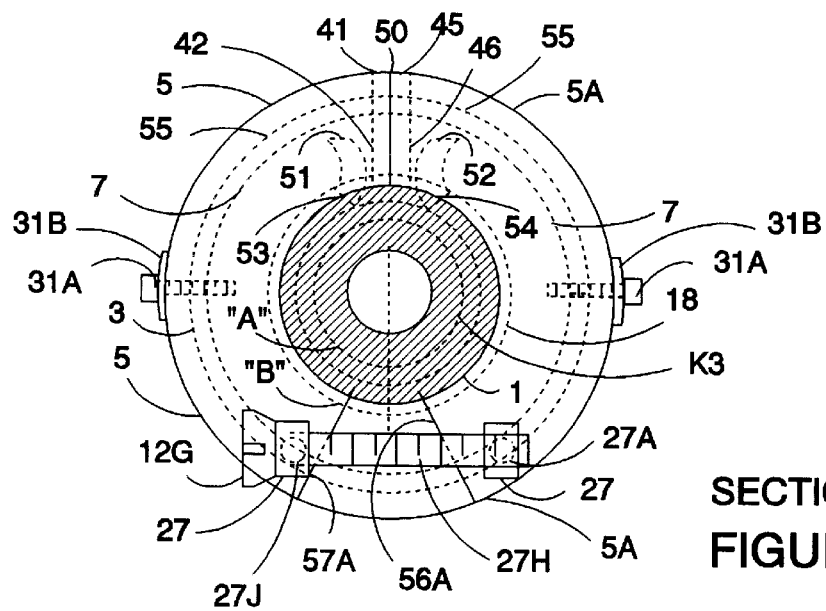

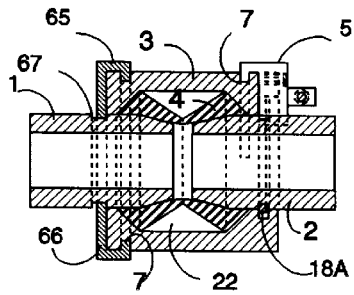
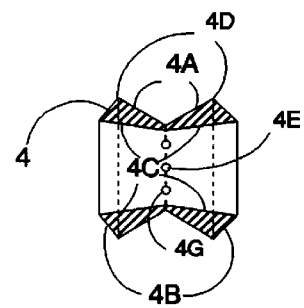
FIGURE 3.                          FIGURE 4.
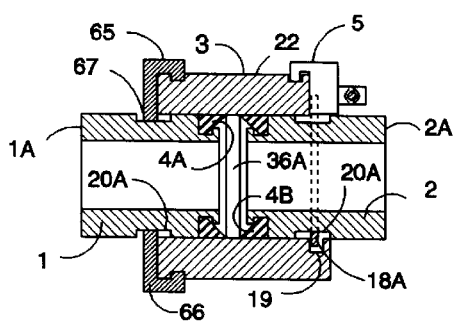
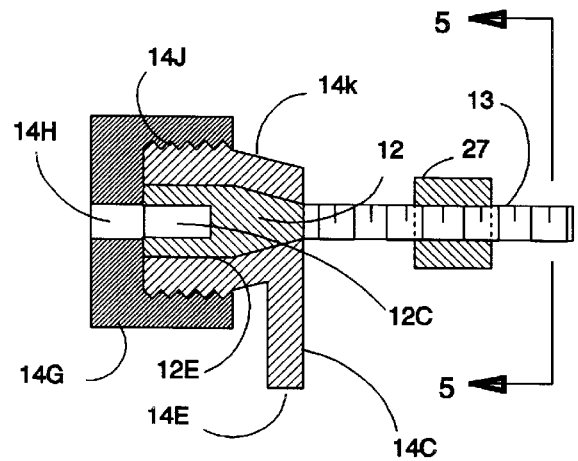
FIGURE 5.                          FIGURE 15
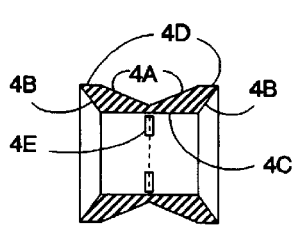
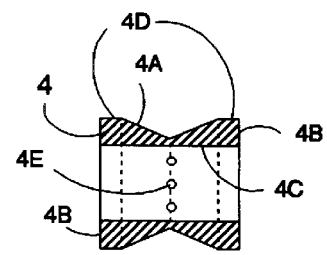
FIGURE 13                          FIGURE 12

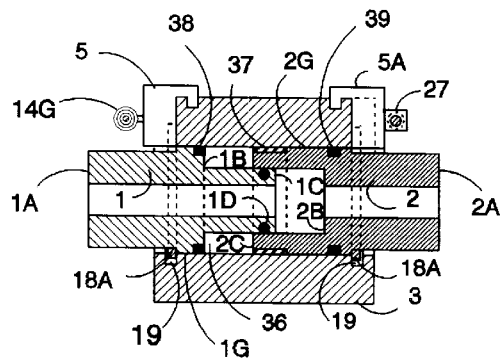
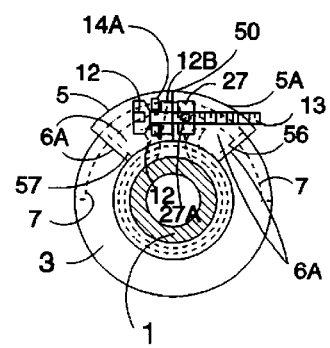
FIGURE 6.  FIGURE 7.
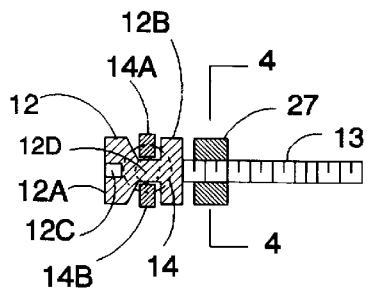
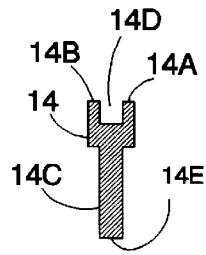
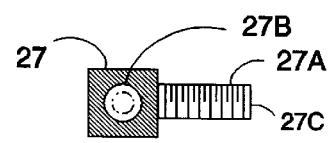
FIGURE 8.  FIGURE 14  SECTION 4-4. FIGURE 9.
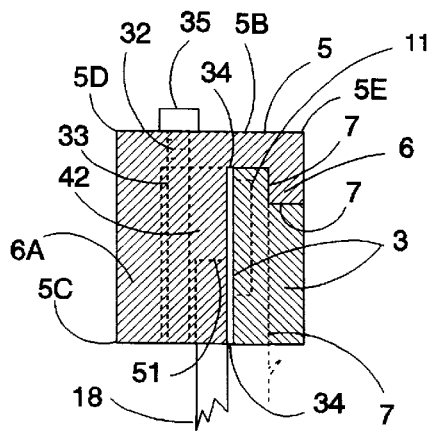
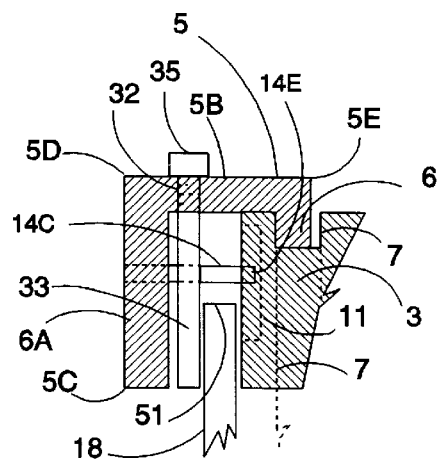
SECTION 2-2  SECTION 3-3
FIGURE 10.  FIGURE 11.

SECTION 6-6

SINGLE BOLT COUPLING

RELATED APPLICATION

This is a continuation-in-part of my application Ser. No. 08/996,987, filed Dec. 25, 1997, which is abandoned.

BACKGROUND OF THE INVENTION

1. Field

The invention is in the field of pipe couplings to couple the end portion of pipes, hoses, valves, pipe fittings and expansion joints.

2. State of the Art

There are couplings patented under U.S. Pat. Nos. 5,004,274; 5,374,088; 5,653,475 and 4,856,823. Except for U.S. Pat. No. 5,004,274, invented by Kevin R. Bass, all other inventions use partial rings which are driven by radial force. Because of their partial locking range around the pipe, they are rendered weak for high pressure piping systems. The invention by Kevin R. Baas uses lugs attached to the ends of the ring for bell end joint wherein, a bolt and a nut are manipulated separately to expand or to contract the split ring. The invention of Bass works in a single mode to make or unmake the pipe bell joint and there is no coupling so to speak which can be removed to disconnect one pipe from an other pipe. The superiority of my invention over other inventions lies in the circumferential vise in conjunction with the ends of the open ended ring where, said open ends of said ring remain in free state, and they are not attached or welded to any extended lugs or arms. Further, my invention provides two modes of connecting the coupling to the pipe, and the coupling is can be disconnected from the single pipe or both pipes. In the first mode the pipe simply is pushed toward the center of the coupling where, the pipe and the coupling are joined with a simply click of the open ended ring. In the second mode the ring can be expanded by means of a screw vise to any desirable extent before the pipe is pushed into the coupling to minimize an extent of encountering of the ring with the pipe. The other advantage of this new invention is the superior self energizing diaphragm gasket which can work safely against very high pressure.

SUMMARY OF THE INVENTION

From here on the word groove will also be understood to include the shoulder in the end portion of the pipe and also the plain end portion of the pipe. It will also be understood that the word pipe includes the oval pipe as well. This new invention is an improvement on my invention disclosed in U.S. Pat. No. 5,794,988. The ring which is used in new invention is the same but it is expanded by means two jaws of a circumferential vise, which spreads apart the two open ends of the ring. The jaws of the vise and its fixers move concentric about the axis of the coupling. The open ends of said ring are positioned against the two adjacent ribs of the two jaws where, these ribs make dead ended walls of two circumferentially partially rotatable jaws of the vise. When compared with other couplings this invention shortens the over all diameter of the coupling, which is valued in tight spots. The invention operates on principle 3.1416(D1−D2), where D1 is the inner diameter of the ring and D2 is the diameter to which the D1 is expanded beyond the outer diameter of pipe into the inner groove in the end portion of the pipe to release the pipe from the coupling. The required enlargement of the D1 to make a ring joint is very small. The minute expansion of the open ended resilient ring to a greater diameter does not require much travel of the two open ends of the ring in assuming a new position.

According to this invention, a coupling to couple the end of a pipe having an inner circumferential groove housing an open ended ring includes a coupling body with a receiving opening therein so that the coupling body closely receives and surrounds the end portion of a pipe to be coupled. Each open end of each ring is positioned against a dead end wall of the movable jaw. The two dead ended walls of these two movable jaws are abutted and they are used as the jaws of the screw vise to spread apart said two open ends of the ring. The jaws are rotated in the opposite directions about the axis of the coupling to a pre-determined distance to expand the ring to desirable extent to receive the pipe by the coupling or to disconnect the ring from the groove of the pipe. The vise includes a bolt held by two nuts, where each nut is mounted on a adjacent jaw by means of its integral right angled stem. when the jaws of the vise are being opened by moving them in the opposite direction, the dead end walls of the jaws act on against the two said open ends of the ring and create two opposite moments about a point located in the opposite side of the ring. The rotation of the dead end walls about the axis of the coupling, in conjunction with the tendency of the two opposite moments, opens apart the two open ends of the ring and also pushes the ring toward the opposite end of the coupling until the ring encounters the dead end inside the groove inside the coupling body which creates an opposite force. Any further movement of the two jaws expands the ring into the groove which partially houses the ring when the ring is in its natural state.

There are two modes in which the coupling can couple the pipe. The first mode is simply to push the pipe into the receiving end of the coupling until it coincides with the corresponding opposite groove in the end portion of the coupling. In this way, the resilient open ended ring flexes to a larger diameter inside the inner groove of the coupling body, then swings back to its original diameter as soon as the groove inside the coupling body coincides with the groove on the end portion of the pipe. It is assumed that either the pipe has a tapered end, or the ring has a proper geometry of roundness in its cross section, or both, so that there is the least possible amount of resistance in advancing the pipe toward the center of the coupling.

In the second said circumferential vise move expands the ring to a larger diameter and pushes it into the inner groove inside the body of the coupling. The vise can keep the open-ended resilient ring in an expanded position until the ring is brought back to its original diameter by means of said vise. The ring regains its original position by virtue of its memory.

The thickness and geometry of the ring may vary from section to section. In some applications the ring can be made from helical winding of spring wire around solid core made out of wire or spring rod. It is also understood that by widening the width of the resilient ring, arcuate rows of gripping teeth in the inner surface of the ring can be provided which can bite into the surface of plastic or rubber pipe under the exerting pressure of the set of bolts passing through the threaded openings through the coupling body.

It is further understood that instead of the invented diaphragm seal for this coupling, any other type of seal or seals can also be used. The type of shoulder in the end of the pipe will determine the type of seal which will be required.

It is further understood that the circumferential length of the jaws can vary. The ring may be entirely accommodated inside the two jaws accept the gap provided between the jaws for their rotation.

It is further under stood that coupling can be used for hoses where only one ring is need and a shank is made part of the coupling body or male or female threads are provided on one end of the coupling.

THE DRAWINGS

The best mode presently contemplated for carrying out the invention is illustrated in the accompanying drawings, not drawn to any scale, in which:

FIG. 1 is a longitudinal vertical section taken through a coupling of the invention used for joining two pipes in end-to-end relationship, and shows the two joined pipes.

FIG. 2 a transverse vertical section of the coupling of FIG. 1 taken on line 1—1 of FIG. 1.

FIG. 3 a longitudinal vertical section taken through a coupling of the invention used for joining two pipes in end-to-end relationship and showing the two joined pipes, where one end of the coupling has a jaw connector invented in my invention U.S. Pat. No. 5,387,017 and the other end is provided with the connector of this invention.

FIG. 4 a longitudinal vertical sections of the invented diaphragm seal.

FIG. 5 a same section as in FIG. 3, but shows the coupling body without a diaphragm gasket and the cavity for the diaphragm gasket is removed, and two gaskets are provided in the end face of the two pipes connected by the coupling.

FIG. 6, a longitudinal vertical section taken through a coupling of the invention which is used to make an expansion joint.

FIG. 7, a transverse vertical section taken at a pipe at a distance away from the coupling of FIG. 1 and looking directly at the end of the invented coupling.

FIG. 8, a longitudinal vertical section taken through the double headed bolt with a nut, showing, also, the right angle crossing of another bolt between the two flanges of the double headed bolt used in attaching the double headed bolt to the jaw.

FIG. 9, a transverse vertical section of the nut shown in FIG. 8 taken on line 4—4 in FIG. 8.

FIG. 10, an enlarged section of jaw shown in FIGS. 1; 3; 5 and 6, taken on line 2—2 in FIG. 1 through the dead end wall.

FIG. 11, an enlarged section 3—3 in FIG. 1 but a very minute distance away from the dead end wall.

FIG. 12 another of the longitudinal vertical sections of the invented diaphragm seal having a different cross-sectional geometry than in FIG. 4.

FIG. 13 an another longitudinal vertical section of the invented diaphragm seal having a different cross-sectional geometry than in FIG. 4 and FIG. 12.

FIG. 14 a section through the head of the forked headed bolt and its stem.

FIG. 15 a section through the head of capped headed bolt and through its two right angled stems.

Figure 17:
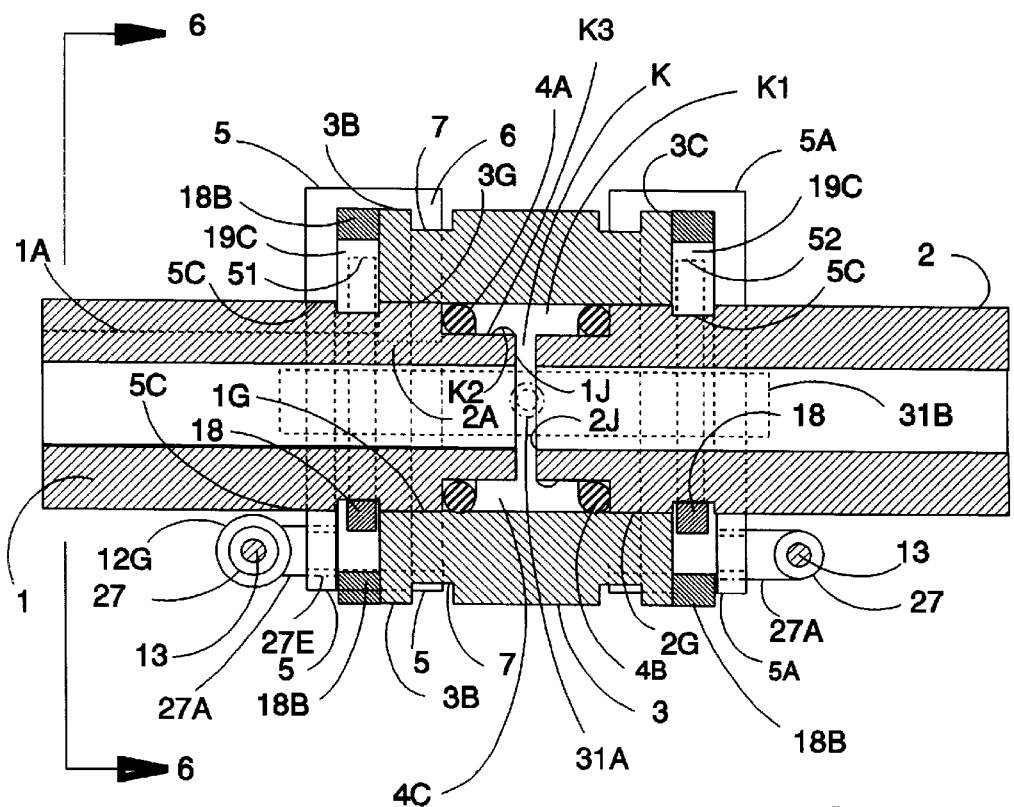

FIG. 16 shows an alternative location and design of vise with section 5—5 taken in FIG. 17.

FIG. 17 a longitudinal section of the coupling and the pipes or hose nipples.

DETAILED DESCRIPTION OF THE ILLUSTRATED EMBODIMENT

From here on, words inner and outer, pertaining to the diameters of the grooves in the inner body of the coupling and the grooves on the end portion of the pipe, and pertaining also to the resilient ring, will be understood to mean as follows: inner diameter means the diameter nearest to the axis of the coupling and outer diameter means the diameter farthest from the axis of the coupling. The word groove, shoulder and plain end will carry the same meaning unless specified differently.

All of the figures in the drawings can be studied together. Except for the labeling of the rings and the shoulders, the letters used in identifying the elements of two different jaws are the same on both ends of the coupling body. The cylindrical coupling body of this invention is made to receive the end portions of pipes by bridging over them, and is made of a length from end 29 to end 30 to extend over grooves or shoulders in the end portions of two pipes being connected and it is made of material to withstand the maximum pressure to which the pipe will be subjected. As shown in FIGS. 1 and 2, the invention may take the form of the coupling having two inner grooves 19 in the end portions 21 and 21A of the coupling 3, housing two respective open ended rings 18 and 18A where open ends of ring 18 are depicted by 51 and 52 in FIG. 2. In FIGS. 1 and 2 most of the ring 18 is housed inside the inner groove in the end portion of the coupling body, but in FIGS. 16 and 17 the ring mostly is housed inside partially rotatable two jaws attached to the end portion of the coupling body. On each end of the coupling body, the coupling is provided with a circumferential vise, which vise includes a set of two jaws 5 and 5A to expand the ring to a lager diameter than its original diameter, to release the pipe from the rings' locking grip on the pipe. The two open end portions of ring 18 shown by sections 53–51 and 54–52 emerge into jaws 5 and 5A. The two rings may be different in their geometrical cross sections, as are rings 18 and 18A, or they may have identical shape. The rings in their inner diameters are smaller than the outer diameter of the pipes. In FIGS. 1 and 2, the inner diameter of ring 18A is equal to the inner diameter 20A of the groove 19, and the inner diameter of ring 18 is equal to 20 shown next to the shoulder 1G. Two connected pipes 1 and 2 by rings 18 and 18A in the end portions of coupling 3 are shown in an end-to-end relationship in FIG. 1. The coupling is fitted with diaphragm gasket 4 in the inner cavity 22 of coupling 3 and circumferentially makes a snug fit with the end portions of pipes 1 and 2 to seal the pipe against fluid leakage. The original position and the geometry of the diaphragm gasket may be similar to the shapes shown in FIGS. 4; 12; and 13. The diaphragm gasket 4 is deformed by the end portion of the pipe when the pipe is pushed toward the center of the coupling body 3. The deformation of gasket 4 in FIG. 1 is exaggerated.

The gap between ends 1J and 2J of pipes 1 and 2 is depicted by K or design of the coupling may provide no gap between the ends 1J and 2J. The end portions of pipes may be tapered, like 1H and 2H, or they may have a different geometry as is shown in FIG. 17. In FIG 1. pipe 2 is provided with a shoulder 2G between tapered end 2H and groove 20A.

In FIG. 2, two open ends of ring 18 are depicted by 51 and 52 and are positioned inside of two movable jaws, 5 and 5A against the dead end walls depicted by 42, and 46. Dead end wall 42 in jaw 5 is depicted in FIG. 10. The geometry of said two jaws of the vise is the same, and their dead end walls 42 and 46 are abutted. The labeling letters which explain one jaw also explain the other jaw. In FIG. 2 each jaw is shown to cover half of the cavity depicted by 55, 56 and 57. Each jaw is substantially is of "U" shape and includes flanges 6A and 6 and connecter piece 5B. The enlarged view of Jaw 5 in FIGS. 1; 3; and 5 is delineated by 5C, 5D, 5E and 6 in FIGS. 10 and 11. FIG. 2 shows jaw 5 delineated by 40, 41, 42 and 43, and jaw 5A delineated by 44, 45, 46, and 47. Abutted position of jaws 5 and 5A in FIG. 2 are depicted by dead end walls 42 and 46 and parting line 50. Angle between the open end sections 53–51 and 54–52 of the ring and the dead end walls of the jaw may vary from one size of the coupling to the next size of the coupling.

Two jaws 5 and 5A in a circumferential vise along with their dead end walls 42 and 46 can partially be rotated in the opposite directions about the axis of the coupling to a pre-determined distance to open apart the two open ends 51 and 52 of ring 18. Thus the dead end walls of said two jaws in a circumferential screw vise become means to expand the ring to a larger diameter to connect or to disconnect the pipe in the coupling. The vise can be understood by studying FIGS. 1, 7, 8, 9 and 14 simultaneously. The vise is explained in terms of screw threaded bolts and two nuts each attached to a separate partially rotatable jaw, where head of the bolt is restricted from slipping away from the nut attached to the jaw or where a bolt with unrestricted head can act up on the jaws only to close the gap between the ends of the jaws not otherwise. Three types of vises are depicted by FIGS. 8, 15 and 16, and two types of nuts with integral stems are shown in FIGS. 9 and 14. In FIG. 8, the vise includes a double headed bolt 12 having two flanges 12A and 12B spaced apart by intermediate stem 12D. The bolt 12 along with its stem 13 is held in position by nuts 14 and 27 which are attached to the jaws 5 and 5A respectively. The FIGS. 1 and 7 show how and where the vise of FIG. 8 is attached to the jaws. Instead of vise of FIG. 8 the alternate design of vise shown in FIG. 15 also can be used. A forked headed bolt 14 holds 12D between its two parallel flanges 14A and 14B; and its stem 14C with end 14E is movably keyed into the groove 11 located inside said cavity. Stem 14C passes through the opening in the outer wall 6A of jaw 5. The threaded stem 27A of nut 27 is screwed into the outer wall 6A of jaw 5A and its end 27C is movably keyed into groove 11. In FIG. 9, threaded opening through head 27 is shown by 27B. The vise is constructed by integrating jaws 5 and 5A, double headed bolt 12, nut 27 and forked headed bolt 14 in an assembly. The driving force of the screw bolt 12 in the vise can open apart the open ends 51 and 52 of ring 18 or can permit the open ends to move back when jaws are moved to their abutted position. The double headed bolt 12 can be rotated by means of a key or a screw driver by inserting its end into the corresponding opening 12C. The vise pushes the jaws apart by creating a gap between the end walls of the jaws and also brings back the walls by closing the gap between the walls, but the ring always has the tendency to close on itself by way of its memory.

Jaws 5 and 5A are held to the coupling body by means of groove 7 and groove 11 in conjunction with keyed ends 14E and 27C into groove 11. In FIG. 1 short flanges shown by 6 of jaw 5 and jaw 5A move and remain inside of groove 7. It should be noticed that groove 7 can encircle the entire coupling depending on the design of the coupling and the purpose of the groove. Stems 14C and 27A of bolts 14 and 27 are of equal predetermined length so that their ends 14E and 27C not to inhibit movement of the jaws by remaining inside of groove 11. The inner circumferential ends of the two jaws 5 and 5A are depicted by 5C.

FIG. 1 shows coupling 3 connecting two pipes 1 and 2. Under first mode pipe 2 is pushed into receiving opening 21A until ring 18A engages groove 20A in the end portion of pipe 2 with the groove 19 in the end portion of coupling 3 and establishes a locking position. Similarly pipe 1 with shoulder 1G is pushed into the receiving end 21 of coupling 3 to engage ring 18 against the shoulder 1G and places it in a locking position with groove 19. In doing so the tapered ends 1H and 2H of the two pipes deform diaphragm gasket seal 4 to a snug fit, and each pipe flexes and expands each open ended ring to a larger diameter until the grooves in the pipe and in the coupling body coincide and the ring swings back to its original position into the groove in the end portion of the pipe by virtue of its memory. The outer diameter of the ring remains inside groove 19 and the inner diameter of the ring grips around the pipe inside the groove of the pipe or behind the shoulder as ring 18 does behind shoulder 1G.

The second mode of connecting the coupling with pipe will be explained under FIG. 17.

Once the pipes are connected under any mode, optional bolts, like 31 in FIG. 2, may be used to press the ring to secure the pipe with a tighter grip. Before undoing the connection of either pipe, bolt 31 will have to be pulled back by unscrewing it. Plain end pipe will definitely need such optional bolts.

Disconnecting the pipe is the reverse of connecting the pipe to the coupling. To disconnect the pipe from the coupling, the ring will always need to be expanded beyond the outer diameter of the pipe.

FIG. 3 shows two connected pipes 1 and 2. Pipe 2 is connected by coupling 3 by means of said ring 18A shown also in FIG. 1. The ring 18A is driven by two jaws 5 and 5A of vise as explained earlier under FIG. 1. The other end of the coupling 3 has a set of partially rotatable jaws invented in my invention U.S. Pat. No. 5,387,017. Said set includes jaw members 65 and 66 which engage groove 67 of pipe 1, and groove 7 on and around the end portion of coupling body. It will be pointed here that one end of coupling may be the invented coupling and the other end in FIGS. 5, 6 and 17 may have a different connector; especially in case of hoses' where shanks, male or female threads or flanges are provided. The Jaws are placed circumferentially around the receiving end portion of coupling 3. Said jaw members include camming surfaces which mate with camming surfaces of the coupling body so that as the jaw members move around the receiving opening in one direction, they also move to a closed position, and as they move around the receiving opening in the opposite direction, they move to an open position. Gasket 4 placed in cavity 22 is explained in FIG. 1.

FIG. 4 shows invented diaphragm gasket 4 which covers the end portions of two pipes at once. The gasket 4 will be explained simultaneously along with FIGS. 12 and 13 which differ only in cross-sections but not in their intended function. The diaphragm gasket 4 has outer circumferential sides shown by 4B which slant from points 4D outward in FIG. 4, and are vertical in FIG. 12 and they are slanting inward toward the center of the gasket in FIG. 13. The inner surfaces 4C in FIG. 4 slant inward making a "V", while in FIGS. 12 and 13 a singular surface 4C is cylindrical. The outer sides 4A in FIG. 4 make a circumferential "V" channel, while in FIGS. 12 and 13 "V" channel has flat banks 4D. It might be desirable in some applications that the "V" section shown by 4A in FIGS. 12 and 13 may be covered circumferentially with a thin cover over 4D. When in use these gaskets are expanded somewhat diametrically, to make a snug fit around the end portions of the two pipes which are connected inside the coupling body. Circumferentially, in the center of the gasket, openings or slits 4E are provided for the entrance of the fluid from the pipe line to energize the gasket to prevent leakage. It should be noticed here that in FIG. 17 these diaphragm gaskets also can be used in the cavity K1 over and around the seat K3 by not providing beads K2, and the seat K3 will conform to the design of the diaphragm gasket.

FIG. 5 is the same as FIG. 3, but it is modified to have seals 4A and 4B, and cavity 4 in the coupling body 3 is eliminated. Pipe 2A is connected with the invented ring connector driven with a circumferential vise as explained earlier, while the other end of the coupling has a set of jaws including jaw members 65 and 66 which engage groove 67 on pipe 1 as explained under FIG. 3. The gap 36A between the end of two pipes 1 and 2 is shown by 36A. By providing extra length to groove 67 in pipe 1 and groove 19 in pipe 2 and to gap 36A, the coupling can be made to function as an expansion joint in the piping system or only to accommodate predetermined thermal growth of the two pipes which the coupling connects. Instead of seals 4A and 4B other types of seals, such as, "O" rings may be used.

FIG. 6 shows an expansion joint, made from the same coupling as coupling in FIG. 5, except that, both ends of the coupling are provided with the invented ring coupler having circumferential vise, and one of the vise instead of double headed bolt is provided with a capped headed compound bolt 14G. Bolt 14G is a section 5—5 taken in FIG. 15. The expansion joint is made by lengthening the basic coupling body 3. The expansion joint shows end portions of the two stub pipes 1 and 2 designed to slip over one another to accommodate the predetermined thermal expansion of the pipe. The end 1C and 2C of pipes 1 and 2 telescopically overlap in a movable manner, and "O" ring seal 1D checks the leakage of fluid from the pipe. Instead of "O" ring seal any other type of seal also can be used. The predetermined length of gap 36 between 1B and 2C allows predetermined thermal movement of the pipes. The two open ended rings in the end portions of the coupling body are depicted by 18A and the grooves which accommodate the rings are shown by 19. During the thermal movement of the pipes, movable shoulders 1G and 2G inside the coupling body 3 keep the telescopic slip expansion joint intact. The ends 1A and 2A of the stub pipes 1 and 2 may be welded to the ends of the main pipes in the piping system or stubs may be connected to the main pipes with the invented coupling or different types of connectors. If required packing 37 in shoulder 2G may be used. Gaskets 38 and 39 in conjunction with "O" ring seal 1D, provide double sealing against leakage of fluid through the coupling. The invented circumferential vise and the ring were explained earlier under FIGS. 1 and 2. For clarity, all dotted lines for seals are not shown.

FIG. 7, shows a similar transverse vertical section as of FIG. 2, but it is taken through Pipe 1 a distance away from the coupling 3 of FIG. 1 and looking directly at the end of the invented coupling and at the abutted jaws 5 and 5A with their outer walls 6A; and the circumferential vise. The vise is depicted by the flange 12B and the double headed bolt 12, which bolt is held by forked open head 14A of bolt 14, and nut 27 with threaded stem 27A mounted over stem 13. Double headed bolt 12 and its stem 13 are held together by means of bolt 14 shown in FIG. 14 and a nut 27 shown in FIG. 9. The attachment of jaws 5 and 5A to the coupling body 3 was explained earlier. The extent of the cavity is depicted by 56 and 57.

FIGS. 8 and 9 were explained earlier under FIG. 1, and was also explained under FIG. 7.

FIGS. 10 and 11 can be studied together. FIG. 10, is an enlarged section of jaw 5 taken on line 2—2 in FIG. 2 through the dead ended wall 42 looking toward 51. FIG. 11 is an enlarged section 3—3 taken a minute distance away from the dead ended wall 42 looking again toward 51. For clarity only the stem 14C with its end 14E in groove 11 of forked bolt 14 is shown in FIG. 11, and 14C is not depicted by hidden lines in FIG. 10. The components of the vise external to the outer wall 6A are not shown either. The Jaw 5 is delineated by 5C, 5D, 5E and flange 6 mounted in groove 7. The flat flange 6A of jaw 5 covers the cavity and it is connected to the short parallel flange 6 by means of connector 5B. Flange 6 always remains inside of groove 7. As explained earlier under FIGS. 1 and 2, the jaw 5 is held movably to the coupling body 3 by mounting its short flange 6 in groove 7, and by the end 14E of stem 14C of forked bolt 14 shown in FIG. 14 into the groove 11. Grooves 7 and 11 are concentric to the axis of the coupling 3. Similarly the jaw 5A is held movably to the coupling body 3 by mounting its short flange 6 in groove 7, and by the end 27c of threaded stem 27A of nut 27 into the groove 11. Double headed bolt 12 in FIG. 8 is tied to nut 27 of FIG. 9 by passing its stem 13 though the threaded opening 27B of 27, and 12 is tied loosely to bolt 14 shown in of FIG. 14 by mounting its short stem 12D into the open space 14D between parallel forked flanges 14A and 14B of 14. Thus jaw 5 and jaw 5A are cross linked by the double headed bolt 12 and its threaded stem 13 by means of stem 27A of nut 27 and stem 14C of forked headed bolt 14.

FIGS. 12; 13 and 14 were explained earlier with other figures.

FIG. 15 shows an alternative capped bolt to the double headed bolt 12 and forked headed bolt 14. Bolt 12 with head 12E is provided with a key hole 12c and threaded stem 13, which is mounted inside the head of nut 14K which has right angled stem 14C with end 14E. Further 12E and 14K are capped simultaneously by the cap 14G by the threaded connection 14J. A opening 14H is provided in said cap 14G to drive the bolt 12 by means of a key or screw driver by engaging hole 12C in head 12E. If desired cap 14G can be welded to 14K.

FIG. 16 depicts a section 6—6 taken on pipe 1 in FIG. 17. FIGS. 16 and 17 can be studied together. FIGS. 16 and 17 are similar to FIGS. 1 and 2 except that "O" rings 4A and 4B are used on the end portions of the pipes 1 and 2 or hoses nipples, and jaws 5 and 5A encircle the both ends of the coupling 3 except leaving a predetermined gap between the two ends of the jaws depicted by 56A and 57A in FIG. 16. The gap is bridged by said vises shown in FIGS. 8 and 15 or alternate screw device to pull said ends 56A and 57A closer together and at the same time open apart the open ends 51 and 52 of the ring 18 to expand the ring as explained in FIGS. 1 and 2. Thus, screw device or the vises explained earlier is located in the opposite side to the two open ends of said ring 18. Jaws 5 and 5A are held in place by means of grooves depicted by 7 (which circumferentially encircle the outer end portions of coupling 3) and by bridging brackets 31B crossing over the coupling body 3 and its two jaws. The bracket are tied to the coupling 3 by means of bolts 31A. In this arrangement groove 11 shown in FIG. 2 can be eliminated. FIG. 16 shows only two brackets. The width and number of brackets are determined by the size of the coupling. The mechanical device includes bolt 12G with a threaded stem 27H and a nut 27 of FIG. 9 and a holder 27J. Holder 27J is similar to the nut in FIG. 9, except threaded opening 27B is a opening without threads. The bolt 12G is held to the jaws by means of said nut 27 and holder 27J and their rotatable right angled stems 27A. Bolt 12G can be driven by means of a screw driver or a key. It should be noted that vises shown in FIGS. 8 and 15 also can be used instead of device 12G. Inside the jaws buffer rings 18B are provided between flange 3B and 3C of coupling body 3 and Jaws 5 and 5A. It is also possible that ring 18B is made integral part of coupling 3. It is also possible that in some designs the 18B may not be required. AS in FIG. 1, the inner diameter of ring 18 in FIG. 17 matches the inner diameter of groove in the pipe. Beads like k2 can be provided to restrict the dismounting of "O" rings 4A and 4B. Lines 1A and 2A in FIG. 17 show alternate design of shoulder 3G. Shoulder 3G can be constructed as an integral part of pipe 1 or it can be built by mounting a split ring into the groove indicated by line 2A or simply by welding a ring around the pipe at predetermined distance from the end of the pipe. All other other elements of FIGS. 16 and 17 were discussed previously under FIGS. 1 and 2. The coupling design shown in FIGS. 16 and 17 makes it easier to mount and to dismount the open ended rings and also eliminates the need for groove 11. It also allows the use of rings which are very high in strength because of the ease with which the rings can be mounted or dismounted.

The mechanical assemblies which make a device or vise to expand the open ended ring can equally be made into a screw wrench by extending the head of the screw bolt into the handle to drive the screw stem. Thus, it is possible to eliminate the need of mounting of device or a vise on said jaws. Openings, holes or fixtures can be fixed on the jaws which can be used in conjunction with the screw wrench to make the invention operative. The advantage of mounted device or vise on the jaws is that is provides locking mechanism to lock the jaws when the coupling remains connected to the pipes.

I claim:

1. A single bolt coupling to connect an end portion of a pipe having a circumferential groove with an outer diameter, comprising;
    a coupling body having a receiving opening to closely receive therein the end portion of a pipe to which it is to be connected and to extend over the end portion of the pipe over the circumferential groove in the end portion of the pipe;
    an open ended ring in the receiving opening having a normal inside diameter less than the outer diameter of the groove where two ends of said ring are separated by dead ended counter walls of a set of two circumferentially partially movable jaws attached to the coupling body;
    means for the attachment of the circumferentially partially movable jaws to the coupling body; and
    means to drive the two circumferentially partially movable jaws in opposite directions to expand the ring to allow the end portion of the pipe to which it is to be connected to be received in the opening.

2. A coupling to connect the end portion of a pipe according to claim 1, wherein the open ended ring expands to allow passage into the receiving opening of the end portion of the pipe to which the coupling is to be connected, and the open ended ring is adapted to contract to a closed position around the end portion of the pipe when received in the opening engaging and locking the groove.

3. A coupling to connect the end portion of a pipe according to claim 2, wherein the coupling is adapted to join two pipes in end-to-end relationship, each pipe having an end portion and a groove in the end portion of the pipe, wherein the coupling body receiving opening is adapted to closely receive the end portion of each of two pipes to be joined in end-to-end relationship, the open ended ring being located with respect to the coupling body to engage or to disengage the groove in the end portion of one of the two pipes to be connected, the coupling further includes a second open ended ring in the coupling body spaced at a distance from the open ended ring and located with respect to the coupling body to engage a groove in the end portion of the other of the two pipes to be connected when such other pipe is received in the receiving opening of the coupling body and the second ring contracts to a closed position around the end portion of the other pipe, and to disengage the groove of such other pipe of the two pipes when the inner diameter of the second ring is expanded beyond the outer diameter of the groove of the other pipe.

4. A coupling to connect the end portion of a pipe according to claim 3, wherein the coupling body is substantially cylindrical and of a length to extend over the circumferential groove of one pipe of two pipes to be joined end-to-end and the groove of the other of the two pipes to be joined, wherein the open ended ring is located around one end portion of the receiving opening in the coupling body and the second open ended ring is located around an opposite end portion of the receiving opening in the body.

5. A coupling to connect the end portion of a pipe according to claim 4, wherein the coupling body includes sealing means for sealing around the ends of the pipes to be joined to prevent leakage therefrom.

6. A coupling to connect the end portion of a pipe according to claim 5, wherein the sealing means is at least one gasket.

7. A coupling to connect the end portion of a pipe according to claim 3, wherein the means to drive the two circumferentially movable jaws in opposite directions to expand the open ended ring to allow passage of the groove through the open ended ring is a vise, said vise being an integral part of the coupling.

8. A coupling to connect the end portion of a pipe according to claim 7, additionally including an inner groove in the coupling body housing the open ended ring therein, and wherein the vise is a circumferential vise which simultaneously opens, expands and pushes the open ended ring into the inner groove which houses the open ended ring inside the coupling body when it is desired to expand and open the open ended ring.

9. A coupling to connect the end portion of a pipe according to claim 8, wherein the circumferential vise includes a screw bolt held in a parallel position with respect to outer walls of the jaws by means of two nuts, wherein each nut is attached to respective jaws by an integral rotatable stem fixed in corresponding openings in the jaws.

10. A coupling to connect the end portion of a pipe according to claim 9, wherein the screw vise separates the two open ends of the open ended ring and under the force of the screw vise said walls act upon the open ends of the open ended ring to expand and to push the open ended ring into the inner groove inside the coupling body.

11. A coupling to connect the end portion of a pipe according to claim 10, where each jaw is circumferentially attached to an end portion of the coupling body by means of a concentric circumferential groove to hold a movable flange and by means of bridging cross brackets extending over the jaws which are held in position by bolts passing through brackets into the coupling body.

12. A coupling to connect the end portion of a pipe according to claim 6, wherein the sealing means is a diaphragm gasket around the respective end portions of the two pipes when received in the receiving opening of the coupling body.

13. A coupling to connect the end portion of a pipe according to claim 1, wherein the end portion of a pipe received in the receiving opening can slide in the receiving opening with respect to the coupling body whereby the coupling acts as a thermal expansion joint.

14. A coupling to connect the end portion of a pipe according to claim 9, wherein means to hold the screw bolt to the jaws are the two nuts, each nut having an integral stem emerging from its outer body at a right angle to the axis of the nut, one nut having no threads in its opening but providing restriction against slippage of a head of the screw bolt from the body of the nut.

15. A coupling to connect the end portion of a pipe according to claim 9, wherein each nut has a right angled stem and each nut of the two nuts is fixed by its right angled stem into an opening provided in the body of a respective jaw in a rotatable manner so that both nuts are always aligned with the screw bolt of the vise when the jaws move circumferentially.

16. A coupling to connect the end portion of a pipe according to claim 9, wherein the means for the attachment of the jaws to the coupling body is at least one bridging cross bracket extending over the jaws wherein each bracket is held in position by a bolt passing through the bracket into the coupling body and each bracket is provided with two end flanges which project toward the axis of the coupling.

17. A coupling to connect the end portion of a pipe according to claim 9, wherein the circumferential vise includes a vise wrench which is provided with a screw handle.

18. A single bolt coupling having a receiving opening with an inner diameter in an end thereof to connect an end portion of a pipe having an outer diameter, wherein the outer diameter of the end portion of the pipe is less than the inner diameter of the receiving opening in the end of the coupling, comprising;

a coupling body having a receiving opening to closely receive an end portion of a pipe therein;

an open ended ring, with a normal inside diameter less than the outer diameter of the end portion of the pipe where two ends of said ring are separated by dead ended counter walls of a set of two circumferentially partially movable jaws attached to the coupling body;

means for the attachment of the circumferentially movable jaws to the coupling body; and means to drive the two circumferentially movable jaws in opposite directions to expand the ring to allow the end portion of the pipe to which it is to be connected to be received in the opening.

* * * * *